US007708042B2

(12) United States Patent
McCarthy et al.

(10) Patent No.: US 7,708,042 B2
(45) Date of Patent: May 4, 2010

(54) METHOD AND APPARATUS FOR DELIVERING BARCODE-TO-DOSE LABELS

(75) Inventors: Thomas G. McCarthy, Covington, LA (US); James E. Torina, Bellevue, WA (US); Darcy Clarke, Kent, WA (US); John Andrew Moulds, Encinitas, CA (US); Thomas E. Vorndran, Oceanside, CA (US)

(73) Assignee: Talyst Inc., Bellevue, WA (US)

( * ) Notice: Subject to any disclaimer, the term of this patent is extended or adjusted under 35 U.S.C. 154(b) by 0 days.

(21) Appl. No.: 11/311,705

(22) Filed: Dec. 19, 2005

(65) Prior Publication Data

US 2006/0240249 A1 Oct. 26, 2006

Related U.S. Application Data

(62) Division of application No. 10/918,539, filed on Aug. 13, 2004, now abandoned.

(60) Provisional application No. 60/495,473, filed on Aug. 15, 2003.

(51) Int. Cl.

| | |
|---|---|
| ***B29C 65/48*** | (2006.01) |
| ***B29C 65/80*** | (2006.01) |
| ***B65C 9/36*** | (2006.01) |
| ***B65C 9/02*** | (2006.01) |
| ***B65C 3/08*** | (2006.01) |
| ***B65H 37/04*** | (2006.01) |
| *B65C 9/40* | (2006.01) |
| *B65C 9/20* | (2006.01) |
| *B65C 3/12* | (2006.01) |
| *B65C 3/16* | (2006.01) |

(52) U.S. Cl. ....................... 156/481; 156/285; 156/476; 156/477.1; 156/538; 156/539; 156/540; 156/DIG. 9; 156/DIG. 12; 156/DIG. 18; 156/DIG. 26; 156/DIG. 34; 156/DIG. 37; 156/DIG. 38

(58) Field of Classification Search ................. 156/241, 156/285, 538–542, DIG. 31, 476–477.1, 156/481, 584, DIG. 1–18, DIG. 24–51; 269/21
See application file for complete search history.

(56) References Cited

U.S. PATENT DOCUMENTS 2,492,908 A * 12/1949 Von Hofe .................. 156/538

(Continued)

OTHER PUBLICATIONS

"Engage", http://dictionary.reference.com/browse/engage.*

(Continued)

*Primary Examiner*—Philip C Tucker
*Assistant Examiner*—Sonya Mazumdar
(74) *Attorney, Agent, or Firm*—Christensen O'Conner Johnson Kindness PLLC

(57) ABSTRACT

A labeling apparatus has a source of printed labels that have adhesive backing, a vacuum pickup with two opposable arms, a blower bar to support a label on air. Each opposable arm has its own vacuum head and each head is removably attachable to a respective end portion of the label. The apparatus also has a label position sensor, and the vacuum pickup is movable from a pickup position to a wrap position. Each pickup arm has a plurality of spring loaded pins. A two layer label has a backing strip, an inner layer, and an outer layer, and at least one removable portion of the outer layer. The label has a neck portion and two end portions, such that the label set may be wrapped a container with the two end portions adhered back to back to each other. The neck portion is relatively narrower than either of the two end portions and is relatively offset so that it is closer to a front edge of the label.

16 Claims, 10 Drawing Sheets

U.S. PATENT DOCUMENTS

| | | | | | |
|---|---|---|---|---|---|
| 3,152,943 | A | | 10/1964 | Eddison | |
| 3,206,347 | A | * | 9/1965 | Holstein | 156/476 |
| 3,729,362 | A | * | 4/1973 | French et al. | 156/542 |
| 3,899,913 | A | * | 8/1975 | Schlosser et al. | 72/383 |
| 4,025,382 | A | | 5/1977 | Del Rosso | 156/497 |
| 4,124,436 | A | | 11/1978 | Pettis, Jr. et al. | 156/542 |
| 4,210,484 | A | | 7/1980 | Crankshaw et al. | 156/542 |
| 4,314,869 | A | | 2/1982 | Crankshaw | 156/215 |
| 4,324,058 | A | | 4/1982 | Sherwick | |
| RE30,958 | E | | 6/1982 | White | |
| 4,582,474 | A | * | 4/1986 | Ziegler | 425/503 |
| 4,700,976 | A | | 10/1987 | Loose | |
| 4,835,372 | A | | 5/1989 | Gombrich et al. | 235/375 |
| 4,838,776 | A | * | 6/1989 | Hasl | 425/112 |
| 4,884,827 | A | | 12/1989 | Kelley | 283/81 |
| 4,921,277 | A | | 5/1990 | McDonough | 283/81 |
| 4,980,014 | A | * | 12/1990 | DiFrank et al. | 156/481 |
| 5,021,116 | A | * | 6/1991 | Milgram et al. | 156/475 |
| 5,167,752 | A | | 12/1992 | Dowling | 156/512 |
| 5,304,264 | A | | 4/1994 | Wehrmann | 156/64 |
| 5,435,862 | A | | 7/1995 | Williams et al. | 156/64 |
| 5,540,795 | A | | 7/1996 | Franklin et al. | 156/64 |
| 5,597,995 | A | | 1/1997 | Williams et al. | 235/375 |
| 5,601,314 | A | | 2/1997 | Burns et al. | 283/81 |
| 5,602,377 | A | | 2/1997 | Beller et al. | 235/462 |
| 5,692,640 | A | | 12/1997 | Caulfield et al. | 221/70 |
| 5,829,788 | A | | 11/1998 | Jackson | 283/81 |
| 5,845,264 | A | | 12/1998 | Nellhaus | 705/28 |
| 5,865,918 | A | * | 2/1999 | Franklin et al. | 156/64 |
| 5,958,536 | A | | 9/1999 | Gelsinger et al. | 428/40.1 |
| 6,009,926 | A | * | 1/2000 | Vicktorius et al. | 156/556 |
| 6,021,392 | A | | 2/2000 | Lester et al. | 705/2 |
| 6,125,563 | A | * | 10/2000 | Girerd | 40/310 |
| 6,170,746 | B1 | | 1/2001 | Brook et al. | 235/385 |
| 6,189,936 | B1 | | 2/2001 | Erber et al. | 283/81 |
| 6,206,590 | B1 | | 3/2001 | Thomas et al. | 400/586 |
| 6,219,587 | B1 | | 4/2001 | Ahlin et al. | 700/233 |
| 6,321,812 | B1 | * | 11/2001 | Kral | 156/446 |
| 6,413,604 | B1 | | 7/2002 | Matthews et al. | 428/40.1 |
| 6,428,640 | B1 | | 8/2002 | Stevens et al. | 156/64 |
| 6,451,149 | B1 | | 9/2002 | McKenney et al. | 156/238 |
| 6,457,747 | B1 | | 10/2002 | Treleaven et al. | 283/81 |
| 6,576,315 | B2 | | 6/2003 | Treleaven et al. | 428/40.1 |
| 6,581,973 | B2 | | 6/2003 | Levine et al. | 283/81 |
| 6,733,855 | B1 | | 5/2004 | Scott | |
| 6,860,513 | B2 | | 3/2005 | Kaufman | |
| 2003/0061750 | A1 | | 4/2003 | Bernier | |
| 2003/0205897 | A1 | | 11/2003 | Kaufman | 283/117 |
| 2004/0088951 | A1 | | 5/2004 | Baldwin et al. | 53/425 |

OTHER PUBLICATIONS

"Engage," definition from Dictionary.com, <http://dictionary.reference.com/browse/engage> retrieved Nov. 25, 2008.

Office Action dated Jan. 3, 2006, from U.S. Appl. No. 10/918,539, filed Aug. 13, 2004, which is the parent of the present application.

Office Action dated Mar. 22, 2006, from U.S. Appl. No. 10/918,539, filed Aug. 13, 2004, which is the parent of the present application.

Office Action dated Dec. 4, 2006, from U.S. Appl. No. 10/918,539, filed Aug. 13, 2004, which is the parent of the present application.

Final Office Action dated May 16, 2007, from U.S. Appl. No. 10/918,539, filed Aug. 13, 2004, which is the parent of the present application.

Advisory Action dated Aug. 20, 2007, from U.S. Appl. No. 10/918,539, filed Aug. 13, 2004, which is the parent of the present application.

Office Action dated Oct. 11, 2007, from U.S. Appl. No. 10/918,539, filed Aug. 13, 2004, which is the parent of the present application.

Final Office Action dated Feb. 12, 2008, from U.S. Appl. No. 10/918,539, filed Aug. 13, 2004, which is the parent of the present application.

Office Action dated May 8, 2007, from U.S. Appl. No. 11/311,706, filed Dec. 19, 2005, which is a division of U.S. Appl. No. 10/918,539, filed Aug. 13, 2004.

Final Office Action dated Sep. 11, 2007, from U.S. Appl. No. 11/311,706, filed Dec. 19, 2005, which is a division of U.S. Appl. No. 10/918,539, filed Aug. 13, 2004.

Office Action dated Nov. 27, 2007, from U.S. Appl. No. 11/311,706, filed Dec. 19, 2005, which is a division of U.S. Appl. No. 10/918,539, filed Aug. 13, 2004.

Final Office Action dated Apr. 4, 2008, from U.S. Appl. No. 11/311,706, filed Dec. 19, 2005, which is a division of U.S. Appl. No. 10/918,539, filed Aug. 13, 2004.

Office Action dated Oct. 28, 2008, from U.S. Appl. No. 11/481,449, filed Jul. 5, 2006, which is a division of U.S. Appl. No. 10/918,539, filed Aug. 13, 2004.

* cited by examiner

Figure 13a
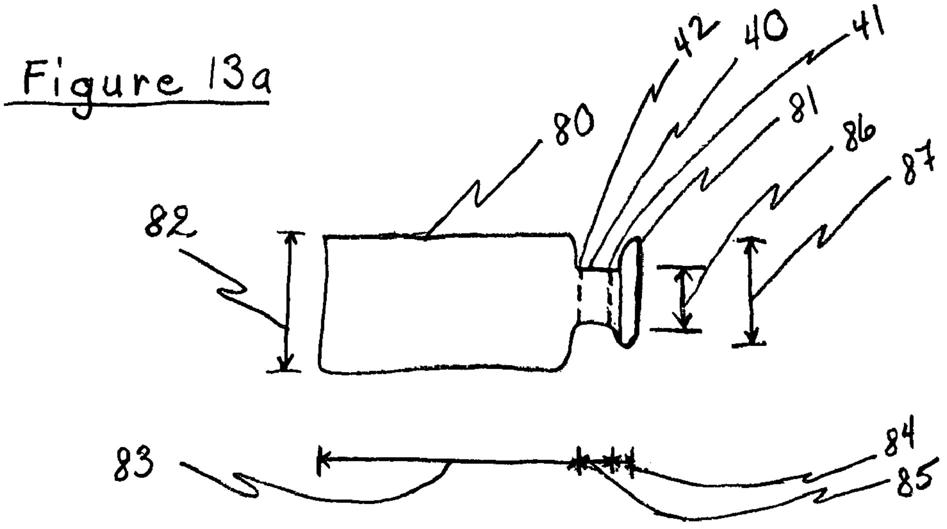
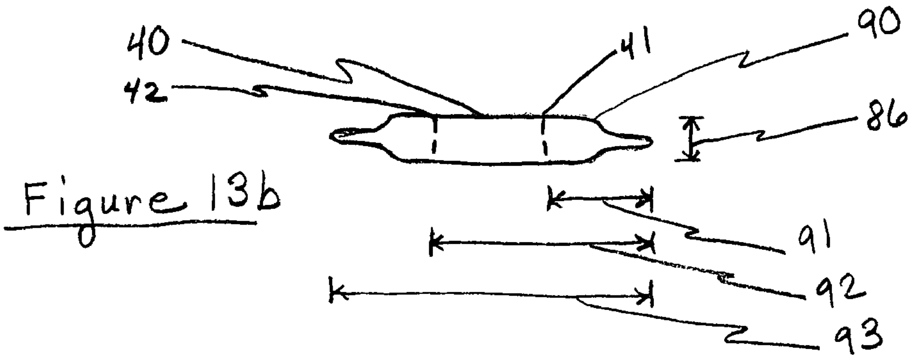
Figure 13b
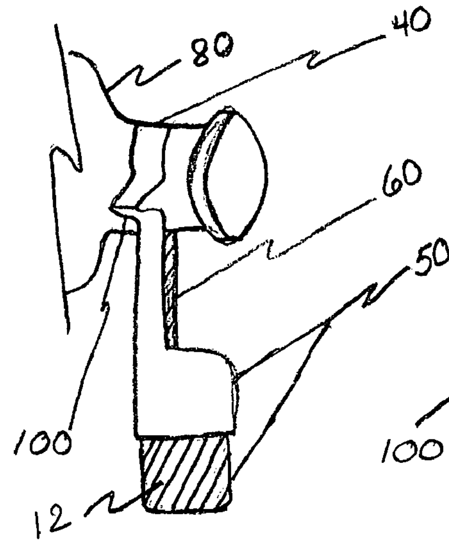
Figure 14a
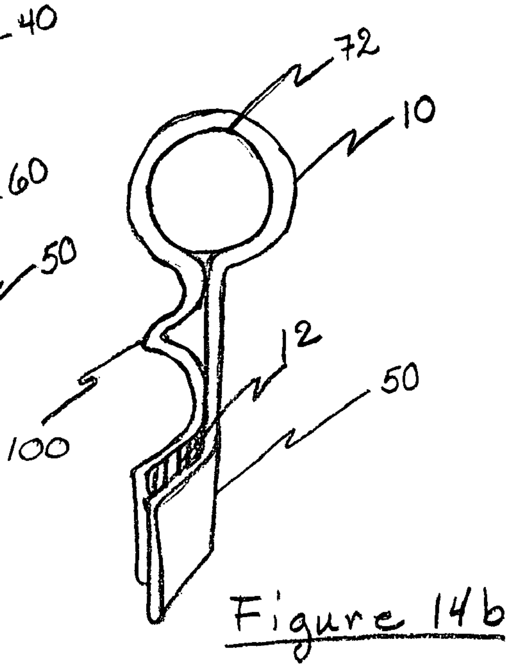
Figure 14b

METHOD AND APPARATUS FOR DELIVERING BARCODE-TO-DOSE LABELS

This application is a division of Ser. No. 10/918,539 now abandoned filed Aug. 13, 2004, which also claimed priority to U.S. provisional application 60/495,473 filed Aug. 15, 2003.

TECHNICAL FIELD

The invention relates to method and apparatus for labels, printing labels and labeling containers with the label; more particularly, it relates to method and apparatus for delivering barcoded dosage labels to injection vials and syringes.

BACKGROUND OF THE INVENTION

Bar coding in patient care and medication delivery is now mandated to administer patient dosing and prevent wrong dosing or inadvertent delivery of medication to the wrong patient. Typically a nurse receives a medication order and fulfills it by going to a station to pull the vial or package of medication for the patient. In the case of an injectable dose, the nurse fills the patient syringe and writes the patient label on tape and puts the taped syringe in her pocket, along with other filled syringes for other patients. Even if the vial was bar coded, the syringe is not, and the tapes are known to come loose as well. What is needed is a method and apparatus for delivering barcode-to-dose labels in a healthcare environment that addresses these concerns.

DISCLOSURE OF THE INVENTION

A novel label is disclosed that has a neck portion and two end or tab or flag portions. The label length is generally and preferably greater than the target circumference of a container to be labeled, and the label is adapted to be wrapped around the selected circumference such that the two end portions or tabs may be adhered back to back to each other to form a flag that thereby depends from the container. Preferred containers are injection vial and ampules. The neck portion of the label is generally and preferably relatively narrower than either of the two end portions, and it is preferably relatively offset so that it is closer to a front edge of the label than to a back edge. Preferred labels have a neck portion length that is greater than or equal to the application circumference measurement. Having a narrower neck advantageously facilitates either manual swiping of the vial neck through the label neck portion, or wrapping of the label around the relatively narrow neck of the vial for durable flag tagging of the vial. Having the neck offset toward a front edge of the label advantageously places the neck of the label in the first-to-peel position as it comes out of the printer, and thus exposes the neck for pickup, while retaining the relatively larger tab area, or a significant portion of the tab area still adhered to the backing strip so that alignment of the label with the carefully aligned backing strip is more readily maintained. In general those skilled in the art will appreciate that mechanical alignment of the label/backing strip, the vacuum pickup arms, and whatever holds the vial in place in the apparatus is both important, and readily established by means well known in the art.

A preferred two layer label set has a backing strip, an inner layer, and an outer layer. The inner layer is releasably adhered to the backing strip and serves at least in part itself as a kind of backing strip for at least one removable portion of the outer layer. This removable portion of the outer layer is preferably less than all of the outer layer, and in preferred embodiments is in fact a removable (releasably adhered) single layer label itself (preferably intended for attachment to the dose delivery device such as a syringe or patient individual dose cup). In preferred embodiments, the removable portion of the outer layer is one of the tab portions of the label, and it is separated on the outer layer from the neck portion by a notch in the outer layer generally at the junction of the neck and the tab.

A preferred barcode to dose delivery system includes the disclosed two layer label set or the like, a medicine container such as a vial or ampule, and a dosing dispenser such as a syringe. The medicine container has a preferred label application circumference, generally and preferably at the neck of the container.

In a basic labeling apparatus embodiment a labeling apparatus has a source of printed labels having adhesive backing, a vacuum head removably attachable to a label, and one or more of the following: a blower bar whereby the label is supported on air from the blower bar; a plurality of spring loaded pins, each pin in a contacting relationship with a portion of the label; a label position sensor. The vacuum pickup is advantageously movable from a pickup position to a wrap position, and the start of the wrap position is determined and detected by the position sensor.

Printed labels can advantageously be pre-printed and loaded into the apparatus for label application, or they can be printed in the apparatus on an otherwise conventional label printer and fed to the labeling portion of the apparatus. Preferably the labels are printed on demand and the printing is controlled by a separate computer operably connected with the apparatus. The computer may be operably connected to a database of medical information and patient information for complete data access by the labeler.

Labels are preferably removably adhered to a conventional adhesive label backing strip of appropriate tensile strength, and after printing, the backing is desirably fed and/or pulled through an opening and across a conventional peel bar to start a free end for each label, the label adhesive thereby exposed and activated for adherence to a container or other selected object. Preferred labels have two layers of label; a first or inner layer is removably adhered to the backing strip. A second or outer layer contains at least a portion of label that is further and releasably adhered to the inner layer, such that the two layer label may be applied to an object, and then a removable label portion of the now adhered label can be removed and adhered elsewhere on the object or on a different object.

After peeling, the free end, or floating end, of the label is preferably then picked up by a vacuum head or vacuum pickup in a manner of conventional temporary, releasable vacuum pickup that will be known to those skilled in the art. In a basic embodiment, the pickup area of the label employed by the vacuum pickup as it attaches to the label need not be significant. Other means of such temporary and releasable pickup, now known or later developed, are contemplated for use with the apparatus, and may be substituted without departing from the scope of the present disclosure. For instance, a pickup head may be faced with a tacky material that has enough temporary adhesion to adhere to the free end of the label and so transport it to another location. In a further instance, some labels might be advantageously provided with tabs or loops or the like, the which can be grabbed or held by releasable mechanical grippers that are integral to the disclosed pickup head.

In addition to the above arrangement in a basic embodiment, a blower bar is optionally provided beneath the free end of the label to support it in non-adhering relation to the rest of the apparatus while waiting for the pickup arm to releasably attach to the label; the label end in effect sits on a cushion of air from the blower bar. In an alternate embodiment a plurality of spring loaded pins are mounted or retained within the pickup head so that upon pickup, each pin is in a contacting relationship with a portion of the label. In other alternates, the apparatus also has a label position sensor, so that as the vacuum pickup and label are moved from a label pickup position to a label wrap position, the start of the wrap position is determined and detected by the position sensor which feeds back in well known manner to the motion of the pickup head and stops it in the wrap position. A preferred wrap position stop point is the point at which the descending label reaches the level of the container to which the label is to be applied. Preferred position sensors are conventional optical sensors, but other sensors such as microswitches and the like known in the art may readily be substituted.

A preferred labeling apparatus includes a source of printed labels having adhesive backing, as discussed above, and a vacuum pickup having two opposable arms, each arm having its own vacuum head, and each head removably attachable to a respective end portion of a label. The arms are preferably mechanically opposable and arcuate, so that at full opposition, the vacuum heads can touch and yet leave space above the heads for a container or a portion of a container therewithin. The arms are preferably actuable into and away from opposition by conventional means such as hydraulic or air cylinders, gears, or other conventional motive linkages.

The labeler preferably includes a blower bar as discussed above, whereby at least the free end of the label is supported on a cushion or layer of air from the blower bar emitted through a plurality of air channels in the bar in a conventional manner. The label is thus freed from adhering relation with any other part of the apparatus at this stage, before it is picked up by the preferred vacuum pickup.

In preferred labelers, the arms are hinged to one another or to a structure in common to them both and they descend together from a reset or default or rest position generally downward to the floating label, with the arms in a splayed, relatively flat orientation to each other, and the two vacuum heads substantially on the same horizontal plane as they descend to each meet their respective end of the label, more or less simultaneously, at which point the vacuum is applied and the label ends are releasably held in the vacuum embrace of the heads. After pickup of the label, the arms move to a position just above the container that is to be labeled (and optionally, the container holding member may also move into optimal labeling position), to a wrap position where the arms are ready to encircle the container and effect the wrap of the label around the container. This wrap position is generally sensed by a label position sensor which is preferably optical in nature. Generally, when the label arms stop, the wrap is effected by the arms moving into opposing positions on either side of the container to be labeled, and pressing or tamping the label to the container and to itself. Vacuum is then released, the arms return to a reset position and the container is released from the apparatus. Alternate position sensors are contemplated in alternate embodiments, such as conventional NC or numerical control mechanisms whereby dimensions of the container are input to a computer, and the arms are moved to the position appropriate to those dimensions, in a manner well known in the art.

Preferred labels are selectably longer than the circumference of the portion of the container to which they are to be applied; thus after wrapping around the container at the selected location and circumference, there is generally an end portion of each label free to adhere, back to back, with the corresponding end portion of the other end of the label. It is this latter portion of the label that is generally referred to herein as the end portion of the label.

A plurality of spring loaded pins, preferably retained within arcuate portions of each pickup arm, and which from point of pickup are in a contacting relationship with a mid portion of the label such that the spring tension operating against each pin is either at a minimal or neutral or relaxed state, are deformable or able to be pushed back into their sockets in the arms against spring tension so that as the container is enveloped by the arcuate arms and the label that is supported by the pins, the pins urge the contacting label portion against the container to be wrapped, and, if there is mid portion of label available beyond what it takes to encircle the container, against the now opposing mid portion of label from around the other side of the bottle.

A preferred labeling system employs a two layer label set as discussed herein, and further includes an injection vial or other medicine container and a syringe or other dose dispenser. The vial has a label application circumference and the two layer label set has a conventional backing strip, an inner layer, and an outer layer. The inner layer is releasably adhered to the backing strip, and serves at least in part as a kind of backing strip for at least one removable portion of the outer layer that is less than all of the outer layer. This removable portion of the outer layer is releasably adhered to the inner layer and is the part that is transferable to the syringe. The label set preferably has a neck portion and two end portions, the label length is selectably greater than the label application circumference at the neck of the vial, so that the label can be wrapped around the application circumference with the two end portions adhered back to back to each other.

In general, the delivery device and process disclosed is to print a two layer label so that transferable labels are removably adhered to a backing which itself has an adhesive backing for attachment to the vial. The vial is then optionally swiped through the two part label and attached thereby to the label. After a syringe is filled from the vial, the transferable (preferably barcoded label) is removed from the backing that is adhered to the vial and transferred to the syringe.

Preferred two layer labels are shaped to have two lobes or tabs, each printable with barcode or other data, separated by and depending from a relatively narrower connecting strip between the lobes. Preferred application of the two lobe label adhesive backing layer is to wrap, either manually or by automated process or device, the narrow neck or connecting strip of the label around the vial, with the backing of the two lobes then adhered to each other to form a unitary-looking tab or flag that is securely attached to the vial and which indicates by barcode and other data on one side the type of medication contained in the vial, and on the other side of the flag, the dosage and patient ID data.

In addition to the process described above, and the novel label, a conventional automated printer for printing data on rolls of these special labels is generally disclosed, wherein the printer puts out labels with the backing adhesive along the neck portion of the label peeled off for the swiping therethrough of the individual vial in such a way as to catch the vial in the connecting strip of the label and then further on, to catch and press together, back-to-back, the two lobes of the label backing attachment.

In some embodiments, the vial or ampule is pulled through an attachment to the printer to seal the backings of the flag portions of the label together thereby securing the label around the neck of the vial or ampule. The purpose of the attachment is to align and position the flags of the label so the backing of both flags seal directly together with little or no additional manual processes. One example of an attachment is to have two plastic or rubber flaps attached to two metal rods that are attached in turn to the printer and positioned directly above the center of the label dispensing area, in the shape of a tight "V". When a vial or ampule is swiped through the center of this flag label, the swipe continues through the plastic or rubber flaps attached to the "V" and seals the backing of both flags of the label directly together.

Also disclosed is method of transferring a label from a backing strip to a medicine container. This is a particular method for a label that has a neck and two end tabs, but may be adapted to employ fewer steps or substitute steps without departing from the scope of this disclosure. One step of the method is peeling away a portion of the backing strip to expose an adhesive surface of the neck of the label, while releasably retaining substantially all of the two tabs on the backing strip. This is preferably accomplished with a conventional peel bar, as discussed herein, but may be performed manually as an alternate. To the extent that the backing strip supports, such as conventional rollers and reels, are held in selected mechanical alignment that facilitates a pickup of the label off the backing strip with the expectation that it will be aligned with the pickup head and the eventual wrapping site, holding a substantial portion of the tabs on the backing strip while the neck is exposed helps advantageously to maintain that alignment, while exposing the neck allows for optional manual or automatic swiping of a vial upwards into the neck so as to pull the label off with it started in wrap on the vial.

An optional step in any preferred method is floating the exposed label neck on a cushion of air, such as for instance by providing a conventional blower bar beneath the peeled off portion of the label.

A further step is picking up the label at each tab with a pickup device, such as a vacuum pickup head, or heads, on pickup arms as disclosed herein, but it is to be understood that the method is not limited to disclosed apparati. A further step is moving the label and pickup device to a position so that the center of the label neck or substantially the center of the label neck is brought to rest upon the container in the place where the label wrap is desired. This is advantageously accomplished with a position sensor to guide the pickup device in stopping its descent and then starting the label wrap when the label neck just meets the container. However, the method step is not limited to a particular sensing apparatus, and includes any means, including manual or visual, of sensing when the label is just or substantially just touching the container.

A further step is wrapping the two tabs down and around the container so that at least a portion of one tab is adherable to, and ultimately adhered to, at least a portion of the other tab, and preferably the two tabs will be fully aligned and adhered to one another to form a flag depending from the container. In preferred methods some means of applying pressure to the neck portion of the label as it wraps around the container so as to press the label firmly against the container is employed. For this purpose a plurality of spring loaded pins in the pickup device is advantageous to press portions of the label to the container, and after the container is wrapped and any neck portion is left over, pressing the back of adjoining neck portions together as well. Other means resilient means can be made to serve as well.

A more basic method disclosed for transferring a label to a medicine container includes some or all of the following steps. One step exposing an adhesive surface of a mid portion of the label (the portion between the end portions is the mid portion, whether the label has any kind of neck or not), while temporarily and releasably retaining two ends of the label in a spaced apart relationship. This facilitates swiping of vials, as discussed herein, and also facilitates pickup of the label ends, either manually or automatically. A further step is interpositioning the medicine container with the mid portion of the label, so that the mid portion of the label is adhered to the container. 'Interpositioning' is intended to cover any combination of motions that bring the vial or container and the label together, including but not limited to swiping the vial toward a relatively stationary label, moving the label to a relatively stationary container, or any combination of these two basic motions. The label is advantageously first adhered to the container at a selectable point on the container by place the label middle, or substantially the middle, first on the point and then wrapping both ends around the container. However, other label start positions and wrap methods may be employed with departing from the scope of this disclosure. A further preferred step is then wrapping the two label ends around the container so that at least a portion of one end is adherable to at least a portion of the other end.

An alternate description of the preferred labeling process runs as follows: the vial or ampule is placed in a holding apparatus, and a sensor detects the vial's or ampule's presence and starts the label printing and application process. The label is printed and moved into position to be removed from the label roll. In preferred processes, the label is moved into the self strip position over the peel bar (preferred conventional Intermec printer presents printed labels this way automatically.) and, as the label exits the printer, it is positioned over a blower bar to float the label in a ready position. Optimally, it is held in place by at least a small area of the label still adhered to the backing.

At this point a sensor checks to establish a vial or ampule is loaded and still properly positioned. The vial is moved forward or the labeling apparatus is moved over the vial and the system enters a "wrap mode". Gripper arms, consisting of apparatus for applying vacuum to the label and spring loaded pins on the surface of the arms facing the vial or ampule, lower to meet the label. When the arms have reached the label position, vacuum is applied, so the label is releasably retained by the gripper arms and the preferred two layer label is pulled off the backing and the roll. When vacuum is achieved, the gripper arms move with the label to a position above the waiting vial. In preferred processes, as soon as the label is moved away from the label present sensor, the next label is produced.

The label is then moved down or the vial or ampule is moved up. In optimal processes, the gripper arms lower over the neck of the vial and a sensor stops the gripper arms in the correct position. The gripper arms wrap around the neck of the vial or the ampule and apply pressure to the label against the neck of the vial or the ampule via the spring loaded pins on the inner surfaces of the arms of the gripper. Once the circumference of the vial or ampule application area has been covered, the spring pins continue to align the neck of the label and the label flags pressing the adhesive surfaces together and forming a "flag" off the side of the vial or ampule.

After the label is adhered to the vial or ampule, the vacuum is released, the gripper arms return to retrieve the next label, and the wrapped vial or ampule is removed.

A preferred method of labeling a dose of medication in a dose dispenser for administration to a patient includes some or all of the following steps. One step is printing a two layer label as discussed herein, an outer layer of which further has the necessary and selected medicine ID data, while a removable dose label in that outer layer of label has the dosage and patient ID data on it, preferably by automatic printing on demand and per dose or per patient. Another step is then attaching the two layer label to a medicine container, and then removing the dose label itself from the outer layer, leaving most of the label on the container, but attaching the dose label to the dosing dispenser, preferably by its own adhesive.

BRIEF DESCRIPTION OF THE DRAWINGS

FIGS. 13*a* and 13*b* are schematic illustrations of typical containers.

FIGS. 14*a* and 14*b* are schematic illustrations of possible misalignments.

BEST MODE OF CARRYING OUT THE INVENTION

Figure 1:
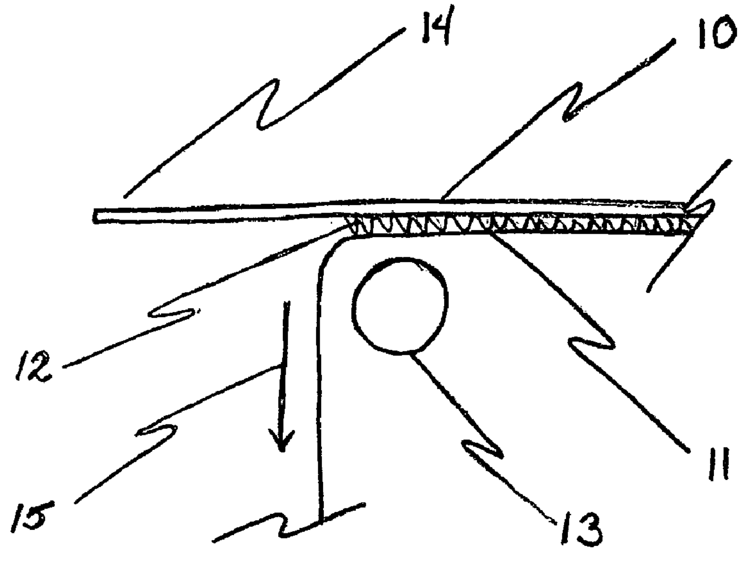
FIG. 1 is a sectional schematic illustration of the peeling of a label.

Turning now to the drawings, the invention will be described in preferred embodiments by reference to the numerals of the drawing figures wherein like numbers indicate like parts.

Figure 2:
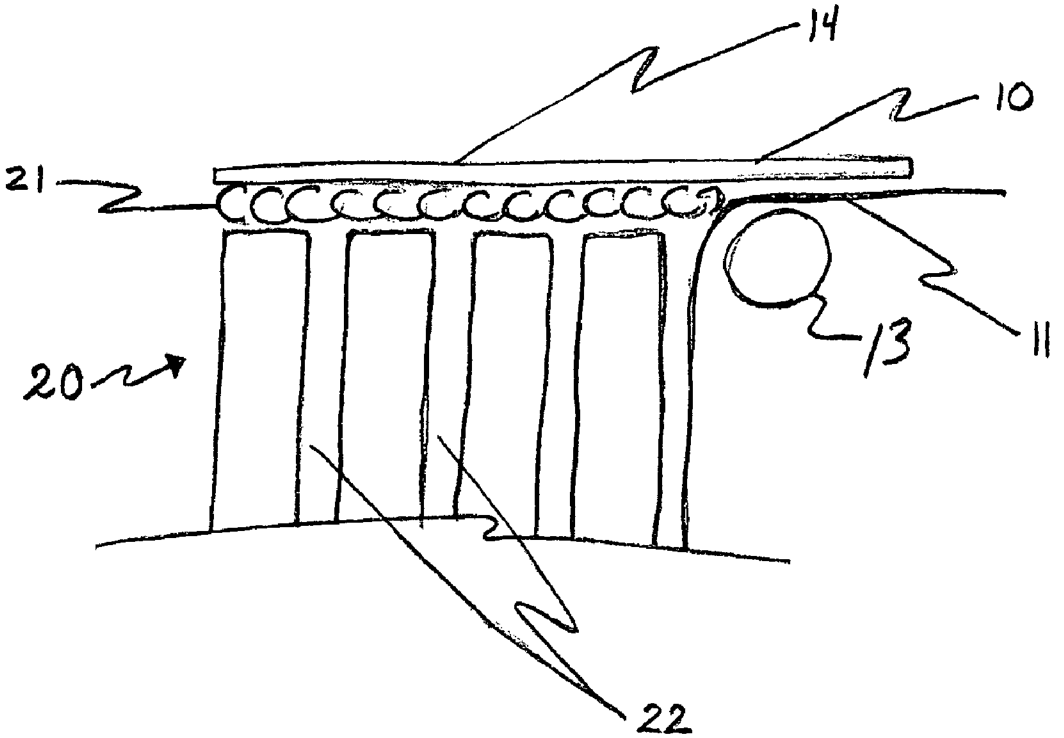
FIG. 2 is a sectional schematic illustration of blower bar air cushion.

FIG. 1 illustrates a preferred separation of label 10 from backing 11 by pulling the backing over peel bar 13 in the direction of arrow 15. Label 10 is adhered to the backing by releasable adhesive 12 and, as is well known, when a backing is pulled over a peel bar, the free portion of label 10 is thrust forward. In FIG. 2, free portion 14 of label 10 is now free, and preferably suspended over blower bar 20, which contains a plurality of air channels 22 creating a cushion of air 21 to suspend and support free portion 14 of label 10 in a non-adhering position and ready for pickup.

Figure 3:
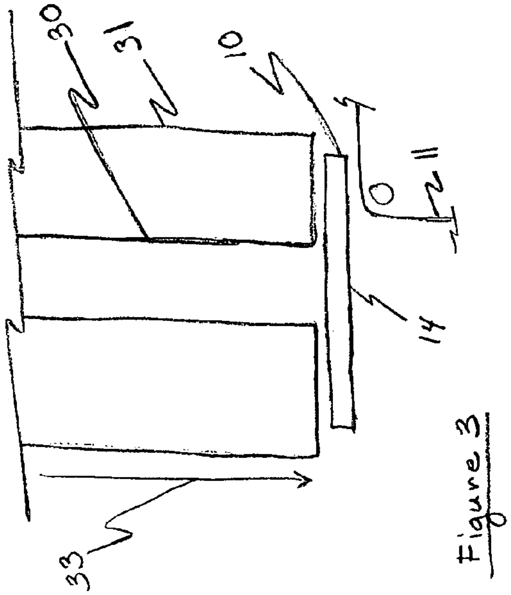
FIG. 3 is a sectional schematic illustration of vacuum head descent and attachment.

FIG. 3 illustrates the attachment of vacuum head 31 to label 10 for purposes of label transport. One or more vacuum channels 30 are disposed within vacuum head 31. As free portion 14 is thrust forward, separating from label backing 11, vacuum head 31 descends in the direction of arrow 33 to meet its surface. Vacuum conveyed in vacuum tube 30 holds the label 10 and, vacuum head 31 is moved, label 10 is completely detached from backing 11. It remains attached to vacuum head 31 for transport to the appropriate application position.

Figure 6:
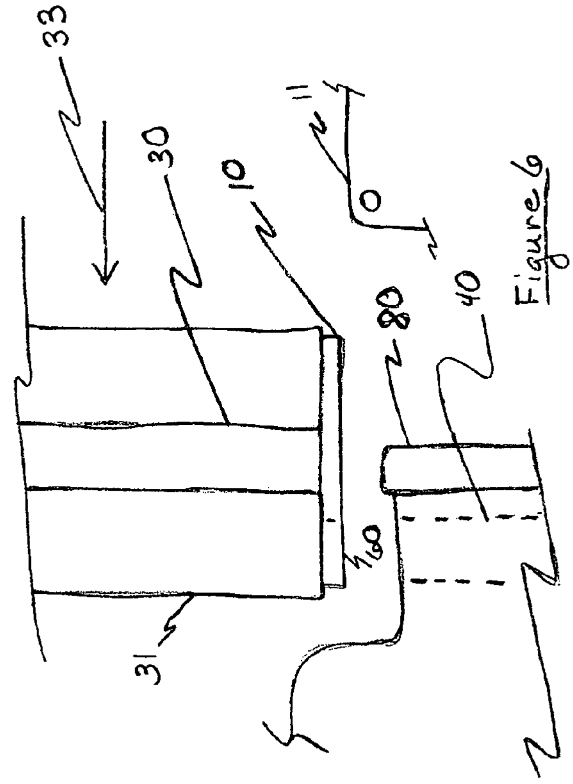
FIG. 6 is a part sectional schematic illustration of the vacuum head with the label aligning over application surface.
Figure 5:
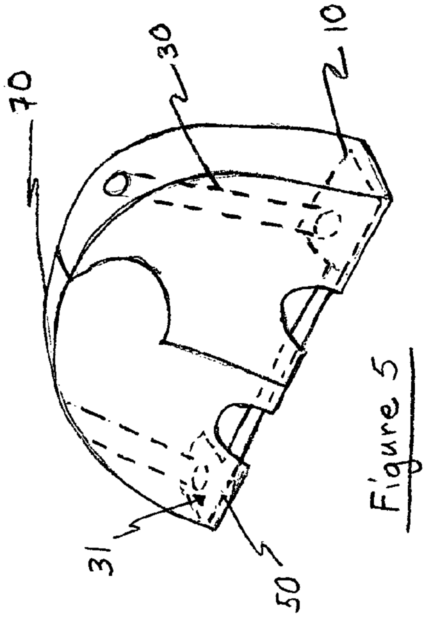
FIG. 5 is an isometric schematic illustrations of the gripper descent and vacuum attachment.
Figure 4:
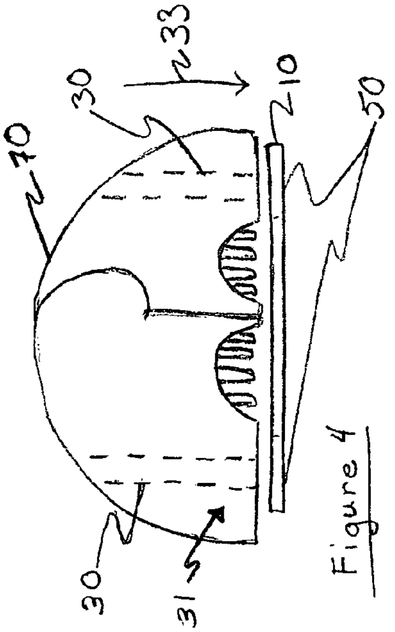
FIG. 4 is an elevational schematic illustrations of the gripper descent and vacuum attachment.

FIGS. 4 and 5 illustrate a like process as in FIG. 3 from a front and isometric view respectively. Gripper arms 70 descend in the direction of arrow 33 with vacuum tubes 30 aligned over the flag or tab portions 50 of label 10. In FIG. 6, label 10, now completely removed from backing 11, and held to the vacuum head 31 by vacuum is moved in the direction of arrow 33 until it is aligned correctly for application onto, in this instance, bottle 80. As is illustrated for this case, neck 60 of label 10 is aligned with the surface 40 for application.

Figure 7:
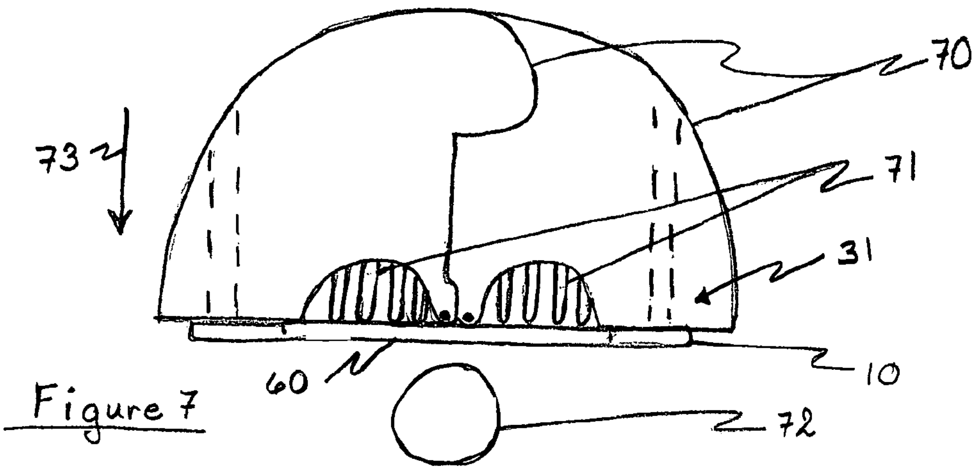
FIGS. 7, 8, 9 and 11 are a staged elevational schematic illustration of the descent and wrap of the gripper arms.
Figure 10:
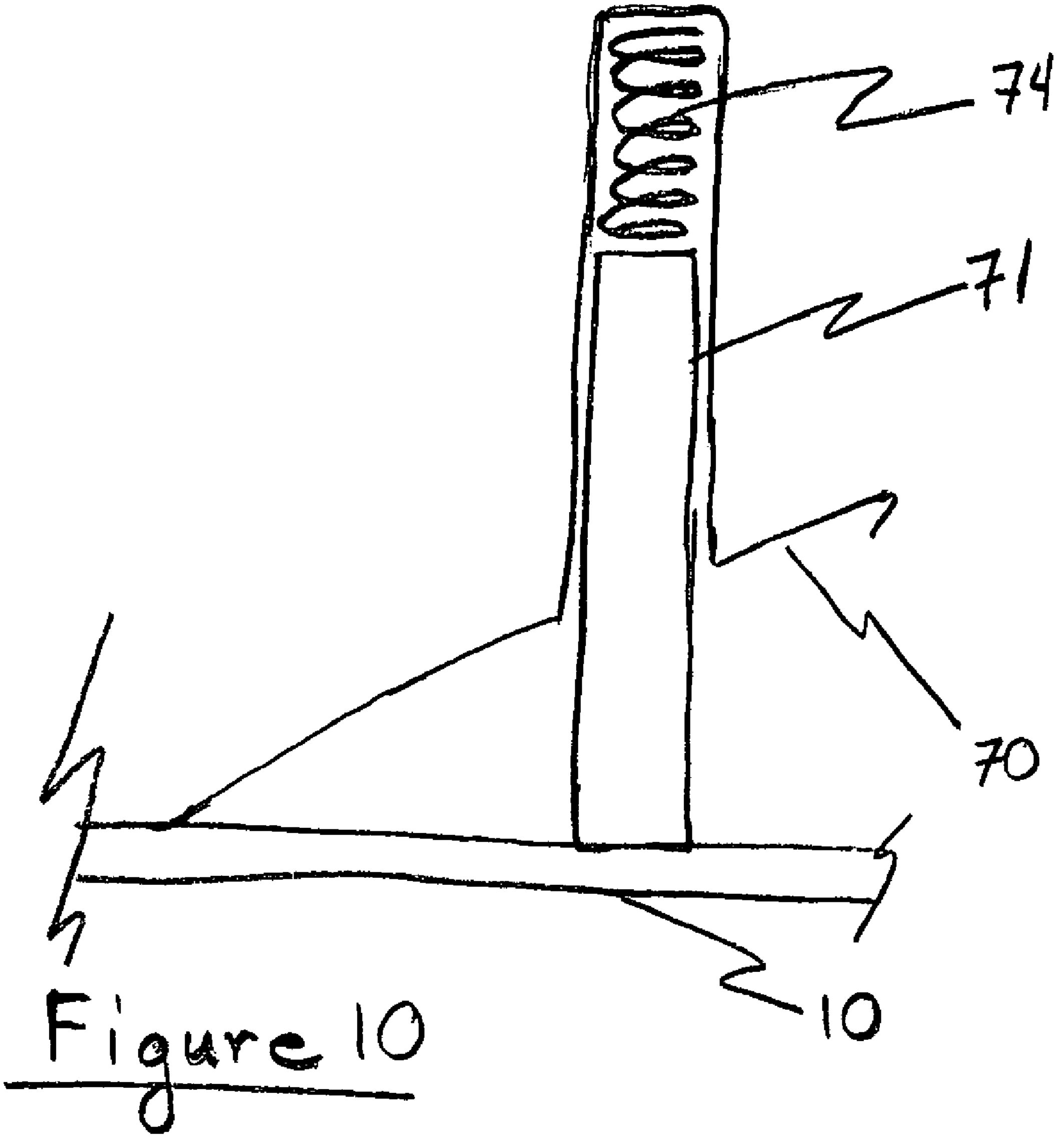
FIG. 10 is a sectional schematic illustration of spring loaded pin.

FIG. 7 illustrates descent of gripper arms 70 holding label 10 in the direction of arrow 73, towards circumference of surface 72 for application. As illustrated, gripper arms 70 contain a plurality of spring loaded pins 71, which at this point are aligned with neck 60. Spring loaded pins 71 are further detailed in FIG. 10. A spring 74 and pin 71 are contained and aligned in a cylindrical tube or bore. Spring 74 and pin 71 are of lengths such that an end of the pin outside the bore is flush with the bottom surface of vacuum heads 31. Optimally, when label 10 is being held against gripper arms 70, no pressure is applied to label 10 by the pins. When label 10 contacts a surface, it is pushed against end of pin 71 which is outside the bore causing pin 71 to retracts against spring 74. Spring 74 is selected to have a spring resistance such as to provide a gentle and constant pressure of pin against label, applying label to surface.

Figure 8:
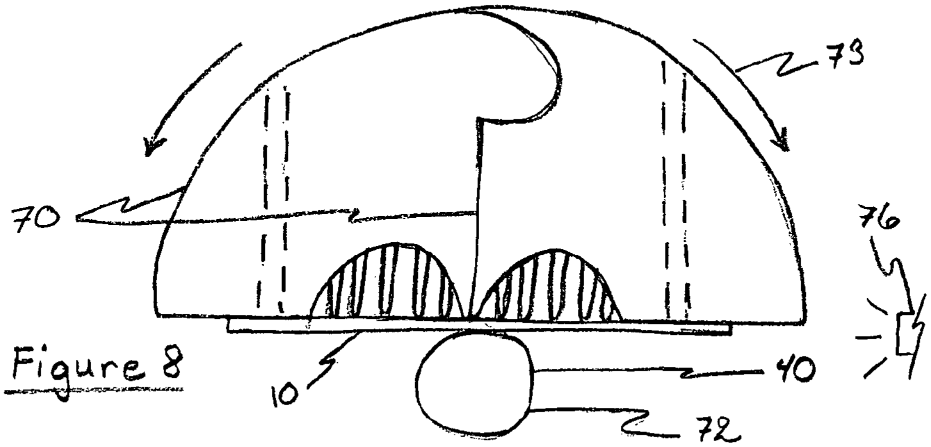
Figure 9:
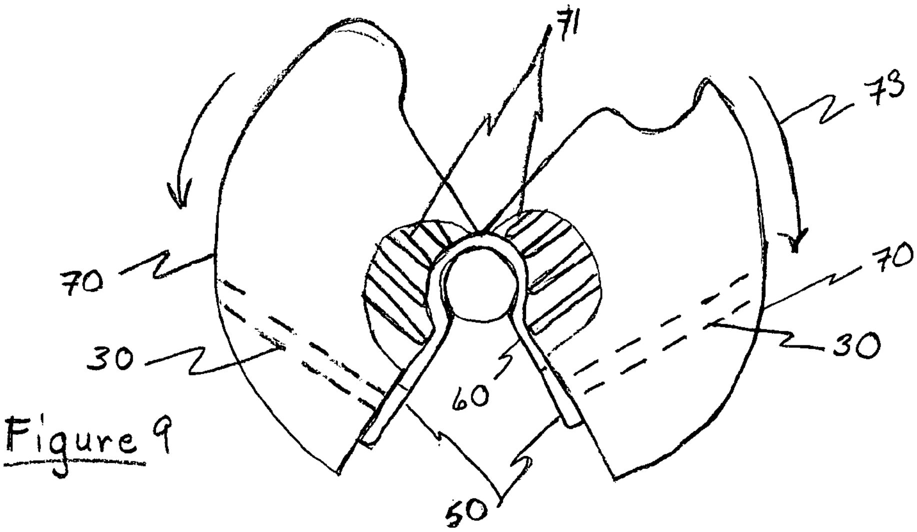
Figure 11:
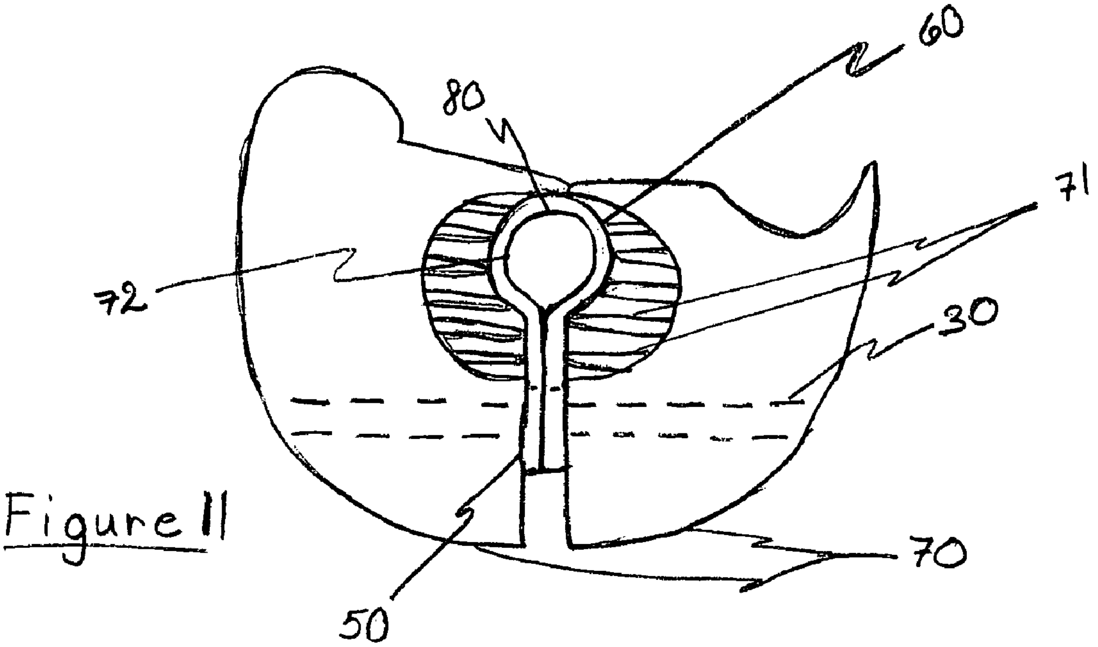
Figure 12:
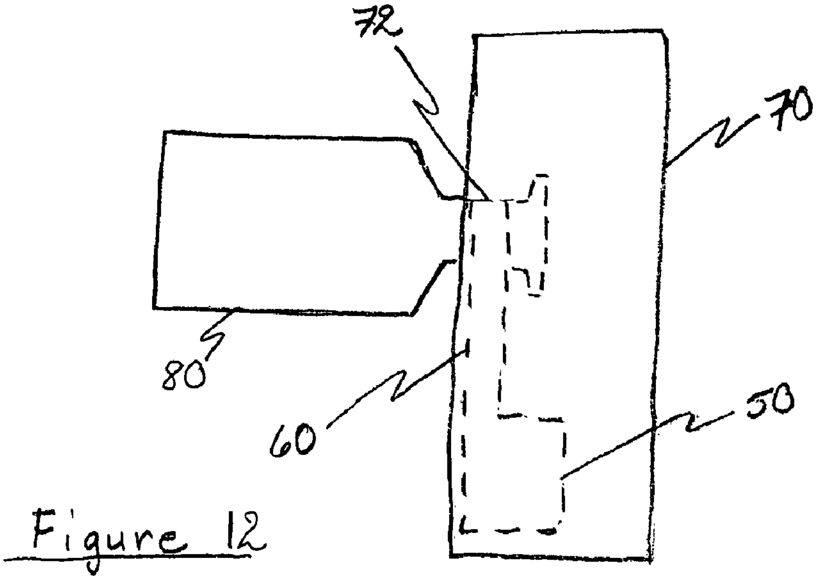
FIG. 12 is side schematic illustration of label wrapping.

In FIG. 8, optical sensor 76 provides feedback to mechanism moving gripper arms, stopping descent of gripper arms once label 10 makes contact with surface 40, and gripper arms 70 begin to rotate in direction of arrow 73 around circumference of surface 72. In FIG. 9, rotation of gripper arms 70 is partially complete. Vacuum tubes 30 are holding flag portions of label 50 tight against vacuum heads 31 for even and aligned application of neck 60. At the same time, at least some spring loaded pins 71 are retracting into bores in gripper arms 70 as they apply continuous pressure to neck 60 causing contact with and adhesion of neck 60 to the container. In FIGS. 11 and 12, gripper arms 70 complete rotational movement around bottle or vial 80. Vacuum tubes 30 hold flag portions of label 50 in alignment, while spring loaded pins 71 apply gentle pressure to neck 60 applying it to entire circumference of bottle 80 and also aligning and pressing neck 60 against itself until flag portions of label 50 are aligned and pressed together forming a single flag off the side of bottle 80.

FIG. 13*a* illustrates dimensions appropriate to application of label 10 to a neck of a bottle or vial 80 that any machinery intended to accomplish disclosed processes advantageously accommodates. Dimension line 85 represents width of surface 40. Dimension line 84 represents distance from top of bottle to top edge 41 of label application surface 40 and dimension line 83 represents distance from bottom of bottle to bottom edge 42 of label application surface 40. Dimension line 86 represents diameter of cylindrical surface for application. Dimension line 87 represents diameter of bottle or vial cap 81 and dimension line 82 represents diameter of body of bottle or vial 80.

FIG. 13*b* illustrates dimensions appropriate to application of label 10 to an ampule 90 Dimension line 91 represents distance from the end of the ampule presented to the machinery to top edge 41 of label application surface 40 and dimension line 92 represents distance to bottom edge 42 of label application surface 40. Dimension line 93 represents total length of ampule and dimension line 86 represents diameter of ampule.

FIGS. 14*a* and 14*b* illustrate ways in which a label may misalign. A fold of label 100 may occur in thin neck of label 60 or in flags 50, causing flags to misalign and exposing label adhesive 12. These misalignments illustrate advantage of maintaining label in a smooth continuous curve during application, avoiding disruptive forces against label during pickup and application, applying an even pressure to label around curved surface of application and maintaining a grip on flags 50 until they are aligned and pressed together (as illustrated in FIGS. 11, 12 and 15*c*).

Figure 15A:
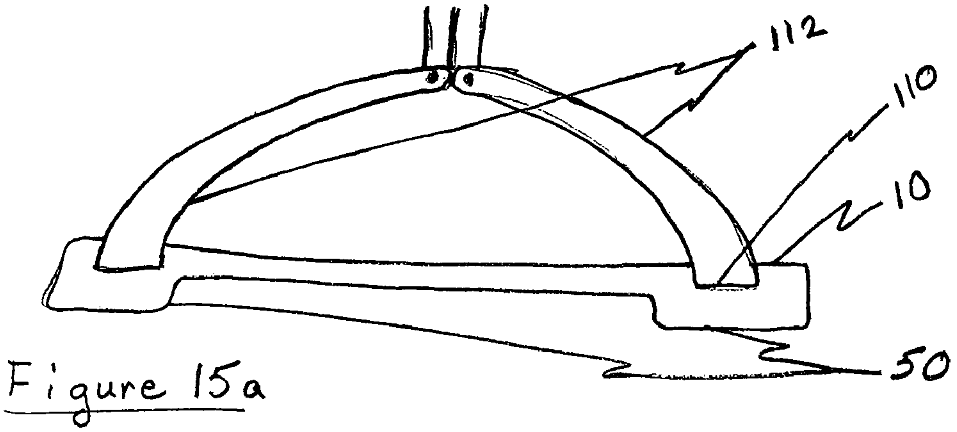
FIG. 15*a-c* are schematic illustrations of alternate label wrapping.
Figure 15B:
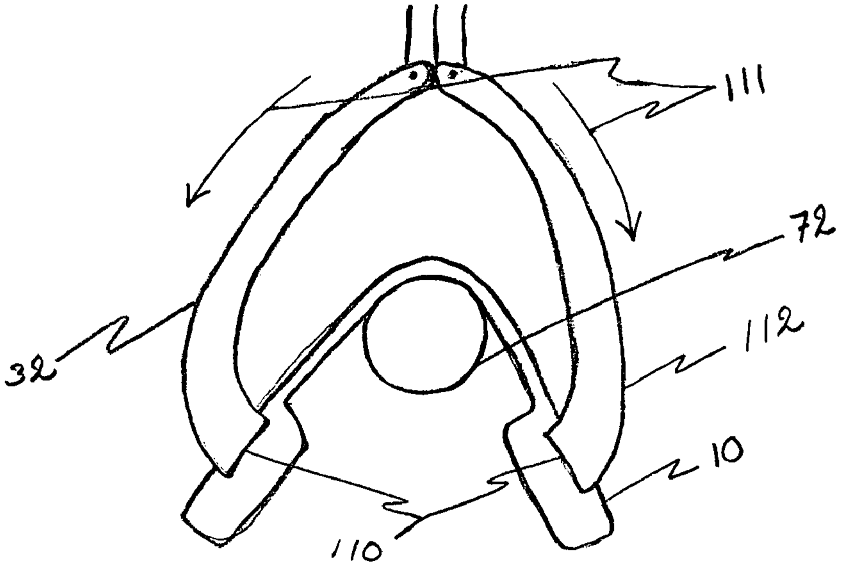
Figure 15C:
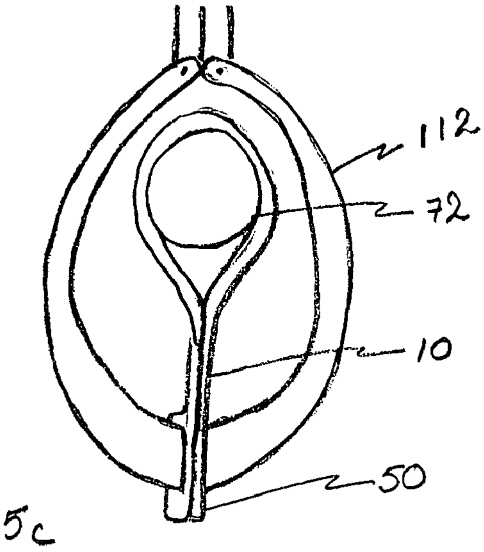

FIGS. 15*a*, 15*b* and 15*c* illustrate alternate application of label 10 around circumference of label application surface 72. Two gripper arms 112 attach to label 10 at label flags 50. Bottle, vial or ampule 72 is brought in contact with label such that gripper arms 112 are rotated around bottle 72 in direction of arrows 111. Flags are advantageously held at gripping surfaces such that label 10 is held relatively taut during application and flags 50 thus aligned and pressed together.

Figure 16:
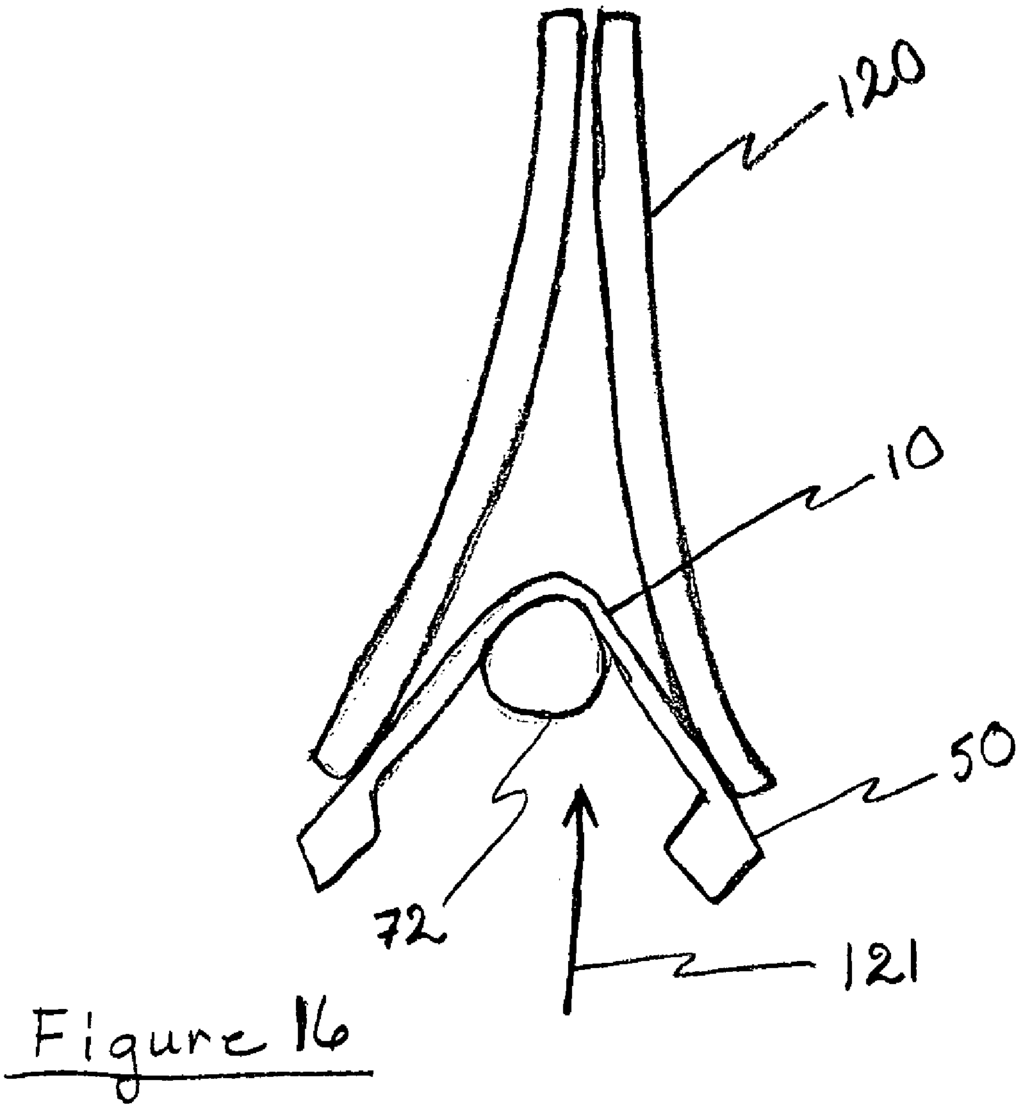
FIG. 16 is a sectional schematic illustration of label wrapping with flaps.

FIG. 16 illustrates application of label 10 bottle 72 with a set of flaps 120. Bottle 72 is brought into contact with label 10 in appropriate alignment. Then label and bottle are both moved in direction of arrow 121 through a set of flexible flaps 120 which are placed to provide a wide opening at the point where bottle 72 enters between flaps 120, and a relatively narrower opening or little opening at all at the point where bottle 72 exits from between flaps 120. By this method flaps 120 provide a steady and even pressure to label 10 pressing it against bottle 72 and applying label around entire circumference of bottle, vial or ampule as it moves through the flaps, much in the manner of squeegeeing wallpaper during application. Flaps are optionally disposed with conventional mounting or linkages at printed label exit point on a conventional printer.

Figure 17:
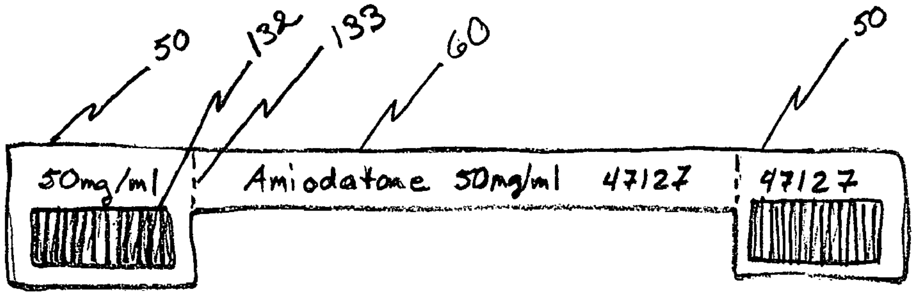
FIG. 17 is a plan view of a typical disclosed label.
Figure 18:
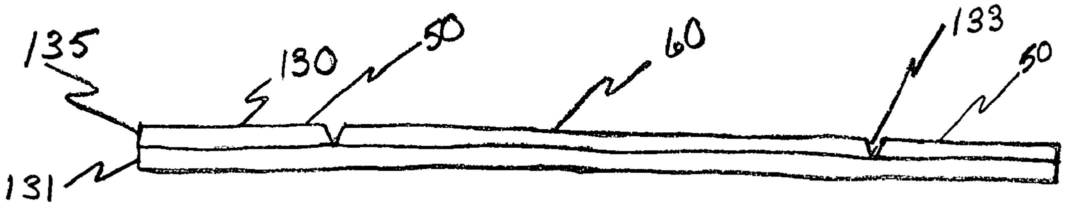
FIG. 18 is a side view of a typical disclosed label.
Figure 19:
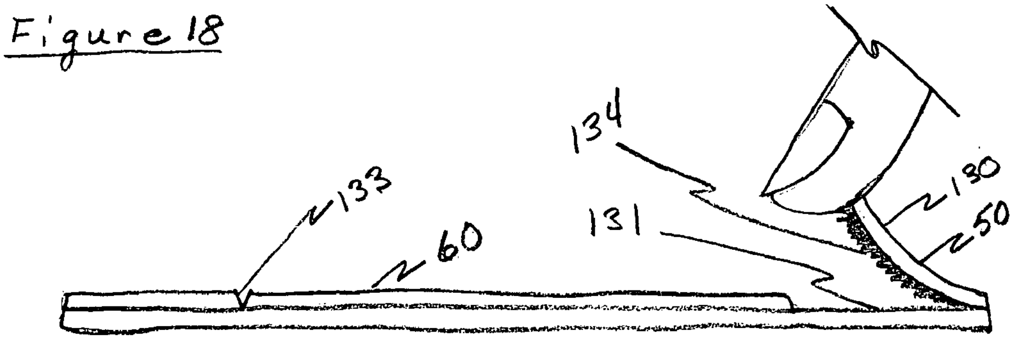
FIG. 19 is a schematic illustration of peeling a removable label.
Figure 20:
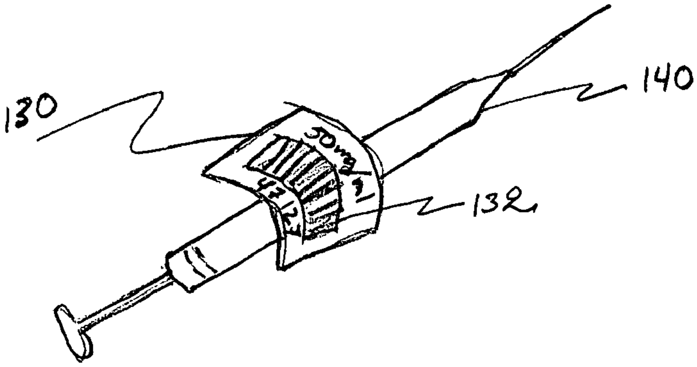
FIG. 20 is a schematic illustration of adhering a removable label to a syringe.

FIG. 17 illustrates two layer label 10 shaped into neck 60 connecting two wider areas or flags or tabs 50. Neck 60 may or may not have printed material, while flags 50 preferably contain data such as printed material 132 including preferred barcode. In FIG. 18, a side view of two layer label 10 illustrates notch 133 cut through top layer 135 of label between flag portion 50 and neck 60, preferably leaving bottom layer 131 of label intact. This creates a removable portion 130 of label 10. FIG. 19 illustrates removal of removable flag portion 130 of label 10 from bottom portion 131 of label 10 by pulling on edge of removable label 130 at notch 133, which is the outer layer of the particular flag 50. Removing label 130 exposes adhesive 134 on back of label, which was releasably adhered to bottom layer 131 of flag 50. In FIG. 20, removable label 130 with its data and optional barcode 132 is applied to syringe 140 thereby safely labeling syringe 40.

Figure 21:
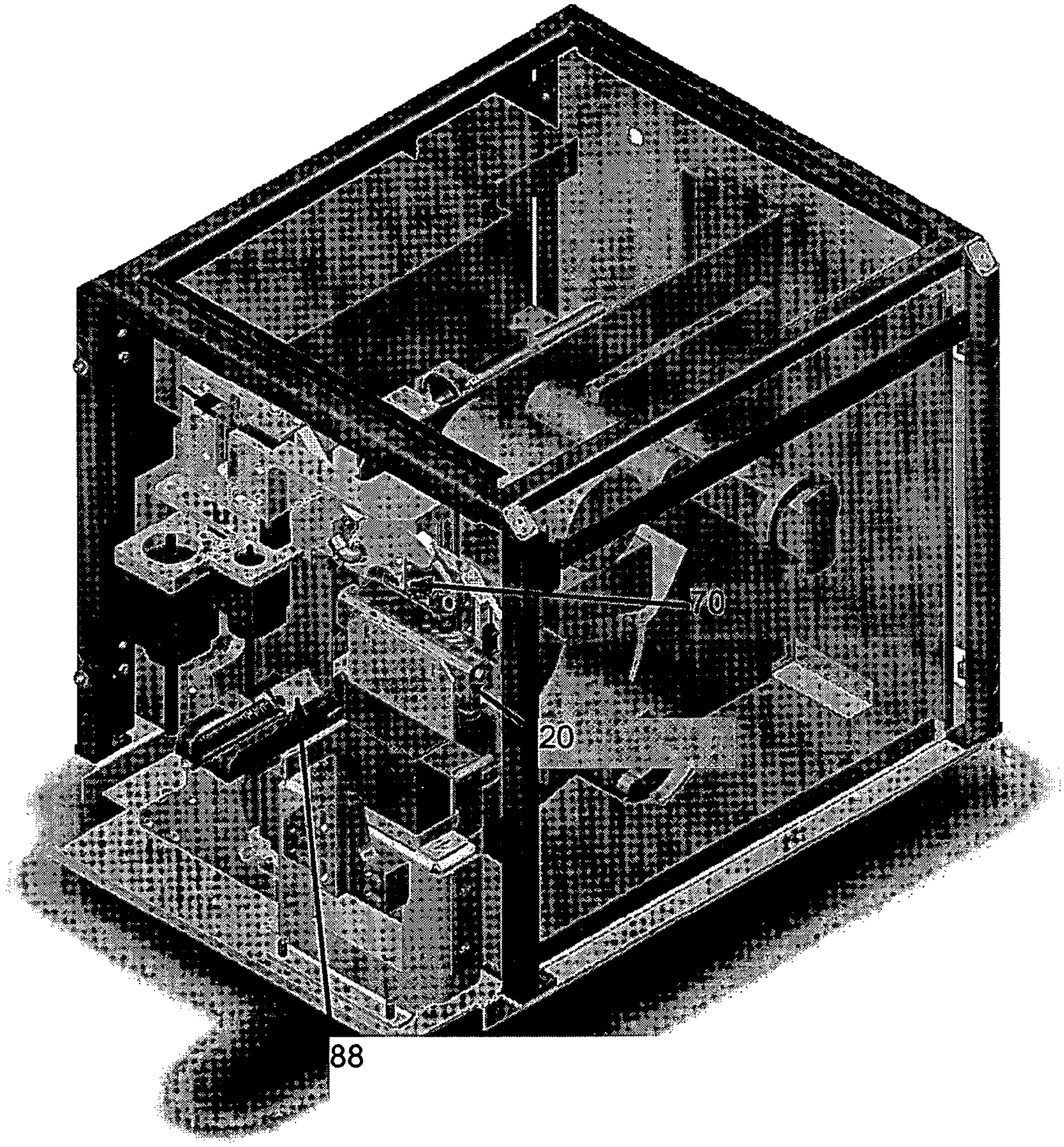
FIG. 21 is an isometric view of a preferred labeling device.

FIG. 21 is an overall schematic of a preferred labeling device shown inside a case. Bottle, vial or ampule is loaded into holder 88, triggering printing of a label. Label is suspended over blower bar 20 on a cushion of air, and gripper arms 70 transport label to the bottle, vial or ampule and apply it, all as more particularly discussed herein.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

INDUSTRIAL APPLICABILITY

The disclosed method and apparatus for safely delivering barcode-to-dose labels in a healthcare environment assures patient dosing and prevents wrong dosing or inadvertent delivery of medication to the wrong patient.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

We claim:

1. A labeling apparatus comprising a source of printed labels, the labels having a first surface and a second surface with an adhesive applied to the second surface, the labeling apparatus further comprising a vacuum pickup having two opposable arms, each arm rotatable about the same substantially fixed axis, each arm defining a label-engaging surface that is fixed relative to the arm and that is engageable with the first surface of a label in a pickup position, each arm having its own vacuum head in communication with the respective label-engaging surface of each arm such that each label-engaging surface is removably attachable to a respective end portion of said label, the opposable arms sized and configured to surround a container in a wrap position such that the label-engaging surfaces abut each other with the end portions of the label sandwiched between the label-engaging surfaces such that the second surface of the end portions of the label are secured to each other.

2. The apparatus of claim 1 wherein the vacuum pickup is movable from the pickup position to the wrap position, and further comprising a label position sensor.

3. The apparatus of claim 1 further comprising a blower bar configured to support at least a portion of the label on air from the blower bar before the label is engaged by the vacuum pickup in the pickup position.

4. The apparatus of claim 1 further comprising a plurality of spring loaded pins disposed in each pickup arm, each pin configured to engage the first surface of the label.

5. The apparatus of claim 2 further comprising a blower bar configured to support the label on air from the blower bar before the label is engaged by the vacuum pickup in the pickup position.

6. The apparatus of claim 2 further comprising a plurality of spring loaded pins disposed in each pickup arm, each pin configured to engage the first surface of the label.

7. The apparatus of claim 5 further comprising a plurality of spring loaded pins disposed in each pickup arm, each pin configured to engage the first surface of the label.

8. The apparatus of claim 3 further comprising a plurality of spring loaded pins disposed in each pickup arm, each pin configured to engage the first surface of the label.

9. The apparatus of claim 1, wherein the label-engaging surfaces are substantially co-planar when the vacuum pickup is in the pick-up position.

10. The apparatus of claim 2, wherein the label position sensor senses the position of the vacuum pickup in the wrap position.

11. The apparatus of claim 4, wherein the pins urge a portion of the label against the container in the wrap position.

12. A labeling apparatus comprising:

(a) a source of printed labels, the labels having a first surface and a second surface with an adhesive applied to the second surface;

(b) a vacuum pickup configured to secure a label to a container, the vacuum pickup comprising:

(i) first and second opposable arms, each arm rotatable about the same substantially fixed axis, each arm having a substantially flat label-engaging surface that is fixed relative to the arm and a recess extending inwardly from the label-engaging surface, the opposable arms configured to move between a pickup position, wherein the label-engaging surfaces are substantially co-planar such that they are engageable with the first surface of a label, and a wrap position, wherein the arms surround a container such that the label-engaging surfaces abut each other with the end portions of the label sandwiched between the label-engaging surfaces to secure the second surface of the end portions of the label together; and ii) a vacuum head in communication with each label-engaging surface such that each label-engaging surface of each arm is removably attachable to a respective end portion of said label.

13. The apparatus of claim 12, wherein the recesses of the first and second opposable arms are sized and configured to cooperatively receive a portion of the container in the wrap position.

14. The apparatus of claim 12, further comprising a plurality of spring loaded pins disposed within the recess in each arm, each pin configured to engage the first surface of the label and urge a portion of the label against a container in the wrap position.

15. The apparatus of claim 12 further comprising a blower bar configured to support at least a portion of the label on air from the blower bar before the label is engaged by the vacuum pickup in the pickup position.

16. The apparatus of claim 15, further comprising a label position sensor that senses the position of the vacuum pickup in the wrap position.

* * * * *